US008417915B2

(12) United States Patent
Gilday et al.

(10) Patent No.: US 8,417,915 B2
(45) Date of Patent: Apr. 9, 2013

(54) ALIAS MANAGEMENT WITHIN A VIRTUALLY INDEXED AND PHYSICALLY TAGGED CACHE MEMORY

(75) Inventors: David Michael Gilday, Sawston (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 1763 days.

(21) Appl. No.: 11/197,523

(22) Filed: Aug. 5, 2005

(65) Prior Publication Data

US 2007/0033318 A1    Feb. 8, 2007

(51) Int. Cl.
*G06F 12/00* (2006.01)
(52) U.S. Cl.
USPC ........... 711/203; 711/118; 711/128; 711/141; 711/144; 711/147; 711/200; 711/202; 711/206; 711/207
(58) Field of Classification Search .............. 711/3, 118, 711/128, 141, 144, 147, 200, 202–203, 206–207
See application file for complete search history.

(56) References Cited

U.S. PATENT DOCUMENTS

| 6,006,312 | A  | * | 12/1999 | Kohn et al. | 711/210 |
| 6,009,503 | A  | * | 12/1999 | Liedtke | 711/203 |
| 6,253,285 | B1 | * | 6/2001 | Razdan et al. | 711/118 |
| 6,477,612 | B1 | * | 11/2002 | Wang | 711/2 |
| 6,715,057 | B1 | * | 3/2004 | Kessler et al. | 711/207 |
| 2004/0064654 | A1 | * | 4/2004 | Willis et al. | 711/150 |
| 2004/0215918 | A1 | * | 10/2004 | Jacobs et al. | 711/207 |

* cited by examiner

*Primary Examiner* — Tuan Thai
*Assistant Examiner* — Zhuo Li
(74) *Attorney, Agent, or Firm* — Nixon & Vanderhye P.C.

(57) ABSTRACT

A virtually indexed and physically tagged memory is described having a cache way size which can exceed the minimum page table size such that aliased virtual addresses VA within the cache way 12 can be mapped to the same physical address PA. Aliasing management logic 10 permits multiple copies of the data from the same physical address to be stored at different virtual indexes within the cache within given or different cache ways.

7 Claims, 3 Drawing Sheets

ALIAS MANAGEMENT WITHIN A VIRTUALLY INDEXED AND PHYSICALLY TAGGED CACHE MEMORY

BACKGROUND OF THE INVENTION

1. Field of the Invention

This invention relates to the field of data processing systems. More particularly, this invention relates to the management of aliasing within virtually indexed and physically tagged (VIPT) cache memories.

2. Description of the Prior Art

It is known within data processing systems to provide cache memories for increasing processor performance. These cache memories have tended to grow larger in size accompanying the general increase in data processing system performance. It is desirable within cache memories that the physical layout of the memory should have a certain aspect ratio to provide a good balance between speed, power consumption, area and other factors. Thus, for a given number of cache ways within a cache memory the size of those cache ways has tended to increase.

Also present within many data processing systems are mechanisms which support translation between virtual addresses and physical addresses. An example of such mechanisms is a memory management unit MMU which serves to translate virtual addresses to physical addresses on a page-by-page basis using page table entries. The page table entry specifies for a given contiguous block of virtual memory addresses what will be the corresponding contiguous block of physical memory addresses. A lookup in the MMU is typically performed in parallel with a lookup in the cache memory for performance reasons. Accordingly, it is known to use virtually indexed and physically tagged cache memories. As will be appreciated by those skilled in the art, in such cache memories the actual cache lookup is performed using a portion of the virtual address referred to as a virtual index. Herein, for simplicity, the term virtual address will be used throughout.

Within such systems where page table entries specify the mapping between virtual and physical addresses, the page size can vary. It is advantageous to have a variable page size to allow the mapping to be configured to match the requirements of the particular system or applications concerned.

A problem arises in virtually indexed and physically tagged memories when the size of a cache way exceeds the minimum page size. In these circumstances, it is possible for more than one virtual address within a cache way to map to the same physical address using respective page table entries (i.e. aliasing). One known way of dealing with this is to constrain the operating system to prevent it from allocating page table entries with page table sizes that can give rise to such aliasing issues. Another way of managing this is to constrain how the operating system allocates physical memory to ensure that all aliases for different virtual addresses which map to the same physical address all map to the same virtual index.

SUMMARY OF THE INVENTION

Viewed from one aspect the present invention provides apparatus for processing data, said apparatus comprising:

a processor operable to generate virtually addressed data access requests, virtual addresses being mapped to physical addresses using a plurality of page table entries, each page table entry having a page size corresponding to how many contiguous virtual addresses are mapped to contiguous physical addresses with that page table entry; and a cache memory having one or more cache ways each comprising a plurality of cache rows and operable to receive said data access requests from said processor, said cache memory being virtually indexed and physically tagged; wherein each of said one or more cache ways is operable to store data values for a block of virtual addresses larger in size than a minimum page size such that a plurality of different virtual addresses corresponding to different cache rows within one of said one or more cache ways can have respective page table entries mapping to a common physical address; and further comprising:

aliasing management logic operable to manage coherency between data values within different cache rows of a plurality of different virtual addresses within a cache way mapping to a common physical address, each of said different cache rows concurrently storing a valid copy of data values stored at said common physical address.

The present technique recognises that it is desirable to remove the requirement for the operating system to avoid establishing virtual to physical address mappings that can lead to aliasing (coherency) problems within cache ways. In particular, it is desirable to have operating systems which can be coded to be independent of the particular processor configuration (e.g. cache way size) upon which it is operating. Furthermore, rather than simply enforcing a policy in which only one copy of data corresponding to a given physical address may be stored within a cache way of a cache memory irrespective of how many virtual addresses within that cache memory mapped to that physical address, the present technique allows multiple copies to be concurrently stored subject to supervision and management by aliasing management logic. The additional overhead of this aliasing management logic is more than compensated for by the avoidance of situations in which a policy which only allowed a single copy to be stored would repeatedly switch which virtual address location within the cache way was storing that copy thereby resulting in an excessive number of cache misses and copy operations. The ability to safely store multiple copies of data from the same physical address within a cache way is particularly useful in situations in which frequent context switches occur which alter the virtual address being used to access a given physical location.

In preferred embodiments, if a cache miss occurs in a situation in which the page size is smaller than the cache way size, then a check is made within the one or more aliased positions which could be storing a copy of data corresponding to the same physical address to see if such data is stored in that location. If such data is present, then it is copied to the location where the miss occurred. It will be appreciated that depending upon the page sizes concerned two, three or more locations may be aliased.

In circumstance in which a write to virtual address is being made, then the aliasing management logic can check any aliased addresses to see if they map to the same physical address and if so make the same write to those aliased locations within the cached way. As an alternative, the aliased addresses could be invalidated when a write is made to another of the virtual addresses which maps to the same physical address.

The present technique is particularly useful in multi-threaded processors which switch between contexts that each have respective page table entries. Such multi-threaded processors schedule and issue instructions from different threads on a hardware basis depending upon execution resource requirements, data dependencies, stall conditions, scheduling policies and other factors. This can result in memory accesses alternating between different aliased copies of the same physical addresses. In these circumstances, the repeated moving of cached data values which could occur due to aliasing within a cache way if multiple copies were not allowed is avoided by the provision of the aliasing management logic.

The aliasing management logic can operate in a variety of ways similar to coherency management which is sometimes undertaken within multi-processor systems where each processor has its own local cache memory and coherency is managed between those different local caches. One particularly suitable management technique is that in which coherency data for each cache row specifying if the cache row is one of modified, shareable or invalid is maintained and the aliasing management logic moves each cache row between modified, shareable and invalid states in accordance with an MSI-type cache management protocol.

Viewed from another aspect the present invention provides a method of processing data, said method comprising the steps of:

generating with a processor virtually addressed data access requests, virtual addresses being mapped to physical addresses using a plurality of page table entries, each page table entry having a page size corresponding to how many contiguous virtual addresses are mapped to contiguous physical addresses with that page table entry; and receiving said data access requests from said processor at a cache memory having one or more cache ways each comprising a plurality of cache rows, said cache memory being virtually indexed and physically tagged; wherein each of said one or more cache ways is operable to store data values for a block of virtual addresses larger in size than a minimum page size such that a plurality of different virtual addresses corresponding to different cache rows within one of said one or more cache ways can have respective page table entries mapping to a common physical address; and further comprising:

managing coherency between data values within different cache rows of a plurality of different virtual addresses within a cache way mapping to a common physical address, each of said different cache rows concurrently storing a valid copy of data values stored at said common physical address.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
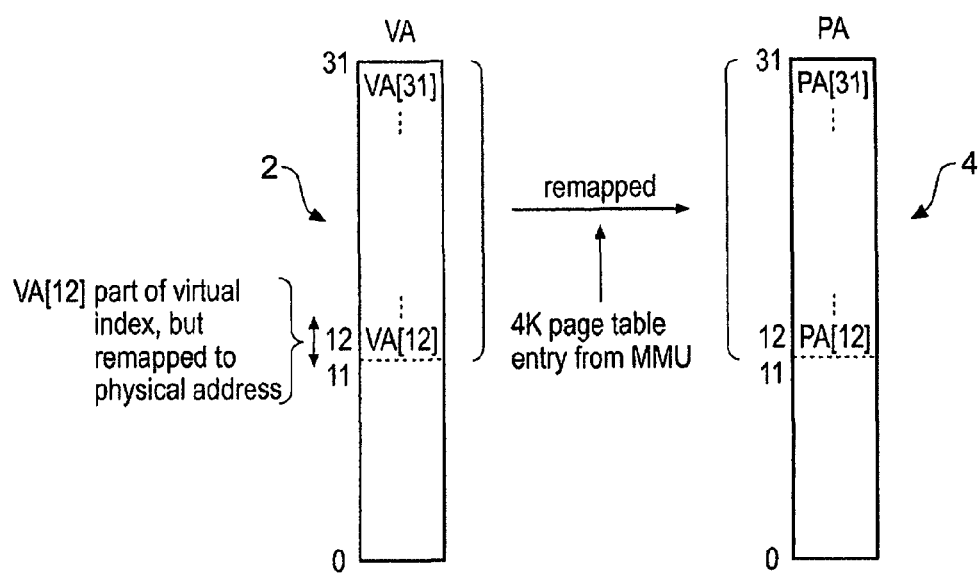
FIG. 1 schematically illustrates a mapping between a virtual address and a physical address.

FIG. 1 shows a virtual address 2 being mapped to a physical address 4. The low order bits [11:0] are mapped unaltered between the virtual address 2 and the physical address 4. In this example a 4 KB page table entry size is applied to the virtual address 2 and accordingly the virtual address bits VA [31:12] map to corresponding physical address bits PA [31:12] as specified by the page table entry. It will be appreciated that aspect ratio considerations balancing speed, power consumption, circuit layout efficiency and the like favour certain aspect ratios of cache memory blocks forming cache ways within a cache memory system such that as cache memory size increases it is becoming commonplace to have cache ways that exceed the minimum page table size offered by the system. Thus, as illustrated in FIG. 1, if a four way cache memory with each cache way being 8 KB in size were used, then a virtual address having either a "0" or "1" at address position VA[12] could map to the same physical address by virtue of different page table entries mapping to the same physical memory address block being present for differing adjacent 4 KB blocks of virtual address space.

Figure 2:
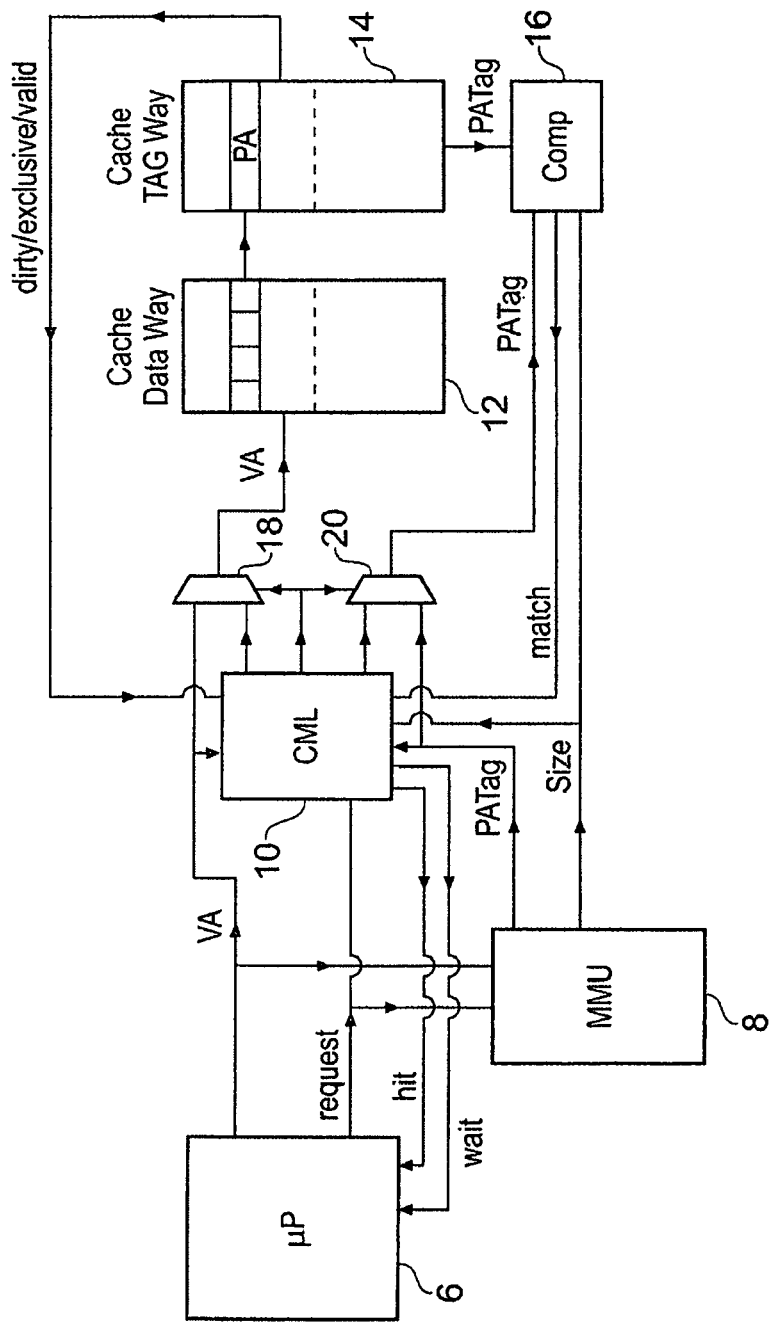
FIG. 2 schematically illustrates a processor and cache memory including aliasing management logic.

FIG. 2 schematically illustrates a part of data processing system including a cache memory incorporating aliasing management logic 10. In this example, a single cache way is illustrated, but it will be appreciated that multiple cache ways may be provided. A common arrangement is for a four way set associative cache memory to be used, although the present technique is not limited to this.

As illustrated, the system of FIG. 2 includes a microprocessor core 6, a memory management unit 8, aliasing management logic 10, a cache data way 12 which is addressed using a virtual address and a cache tag way 14 which stores physical address tags of the data currently held within the cache data way 12. A comparator 16 serves to compare a physical address tag for a virtual address which has hit within the cache data way with the physical address tag looked up and output in parallel by the MMU 8 for that virtual address. If a match occurs and valid and dirty bits for the line have appropriate values, then this is relayed via the aliasing management logic 10 to the microprocessor 6 as a hit signal. This type of virtually indexed, physically tagged cache is in itself known. The aliasing management logic 10 is not normally present and the match signal from the comparator 16 would conventionally be fed straight back to the processor core 6 as a hit signal.

The virtual address VA and the physical address tag are also supplied to the aliasing management logic 10. If a match signal is not received by the aliasing management logic 10 from the comparator 16 for the initial lookup at the virtual address being output by the processor core 6, then depending upon the page table size for the virtual to physical address mapping which is being employed as supplied to the aliasing management logic 10 by the MMU 8, the aliasing management logic 10 will perform checks upon aliased positions within the cache way. In particular, if the page table size for the mapping attempted is such that the cache way is larger than the page table size, then one or more aliased virtual addresses within the cache way may be present which could be storing data mapped with their own page table entry to the same physical address as the lookup which has missed. In this circumstance, the aliasing management logic 10 uses the virtual address and physical address tag it has been supplied, and which it has captured, to drive a series of aliased position lookups using multiplexers 18, 20. Whilst these aliased positions are checked, a wait signal is passed back to the processor core 6 to force the processor core 6 to wait until the appropriate alias lookups have taken place before taking normal cache miss behaviour. If a match is found within one of the aliased positions and the line is valid and clean, then the cache row data within the cache data way 12 for that aliased position is copied to the cache row where the miss originally occurred and the missed data value is returned to the processor core 6.

Matches in the aliased position to dirty lines are handled different, e.g. by moving as will be described later. The same data will then be concurrently stored within two different cache rows. Thus, a lookup to either virtual address which maps to the same physical address may be directly serviced by a cache hit to its own respective cache row without requiring the data to be copied back and forth between cache rows or other wasteful activity. It will be appreciated that in the example of a 8 KB cache way with a 4 KB minimum page size only one alias will exist. However, if larger cache ways were used, then more potentially aliased positions exist which could be checked and within which multiple copies of the same data could be stored corresponding to the same physical address.

Figure 3:
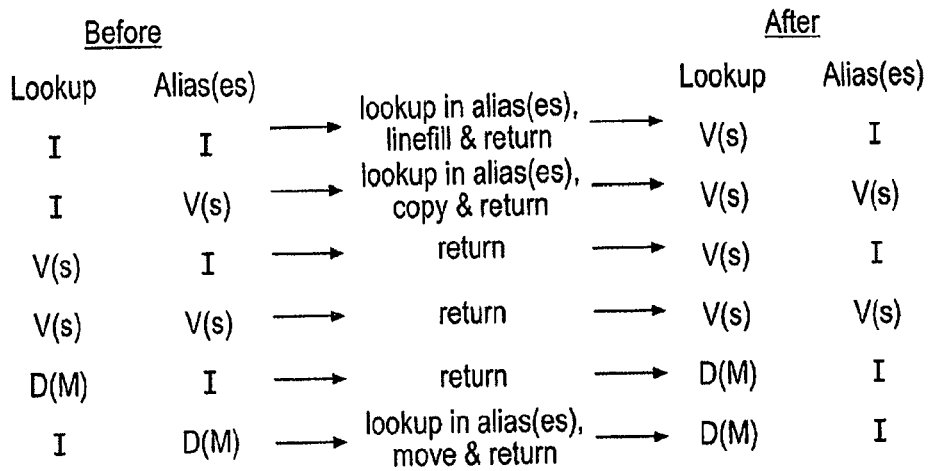
FIG. 3 schematically illustrates the action of the aliasing management logic for read operations in different scenarios.

FIG. 3 schematically illustrates the action of the aliasing management logic 10 in various scenarios. It will be appreciated that the aliasing management logic 10 can be provided as state machine logic operable to detect the initial state as illustrated and then control the operations shown to move the system into the final states illustrated. As shown, the state of a cache line being looked up with a virtual address issued by the processor core 6 together with its potential aliased cache lines (only one illustrated) is shown and may be either invalid I, valid V (Shared) or dirty D (Modified). This corresponds to the MSI type of coherency management protocol which can be employed in multi-processor environments, but in this circumstance applied within a cache way. It will be appreciated that in different embodiments other schemes may be used, such as MESI, and that the present technique is generally applicable to systems in which multiple copies of the same modified physical line can co-exist in the cache, not just clean lines.

In the first example, the cache row initially looked up is invalid and this forces a lookup to be made in the aliased positions dependent upon the page table size. In this example, these aliased positions are also invalid and accordingly a linefill operation is performed to the initial cache row and the data therefrom is returned to the processor core 6. In the second example the cache row initially looked up is again invalid and this triggers a lookup in the aliased position. In this scenario, the aliased positions do include a valid and shareable (e.g. not modified) copy of data mapping to the same physical memory address and accordingly this is copied to the cache row which was initially accessed and is also returned to the processor core 6. After this operation both locations store valid copies of the same data corresponding to the same physical address. This is the scenario previously discussed in relation to FIG. 2.

In the third, fourth and fifth scenarios illustrated, the cache row initially looked in contains either a valid copy of the data or a dirty copy of the data in which case this data is simply returned to the processor core 6. In the final scenario, the cache row initially looked up does not contain the data concerned and accordingly a lookup in the aliased positions is performed. In this scenario, one of the aliased positions being looked up contains a dirty copy of the data corresponding to the same physical address and this is then moved to the cache row in which the initial looked up was made and invalidated in its previous position prior to a return being made of the data to the processor core 6. In the case of dirty data for the MSI protocol being illustrated in this example, only a single dirty copy is permitted. Other coherency management protocols may allow multiple dirty copies to be stored.

Figure 4:
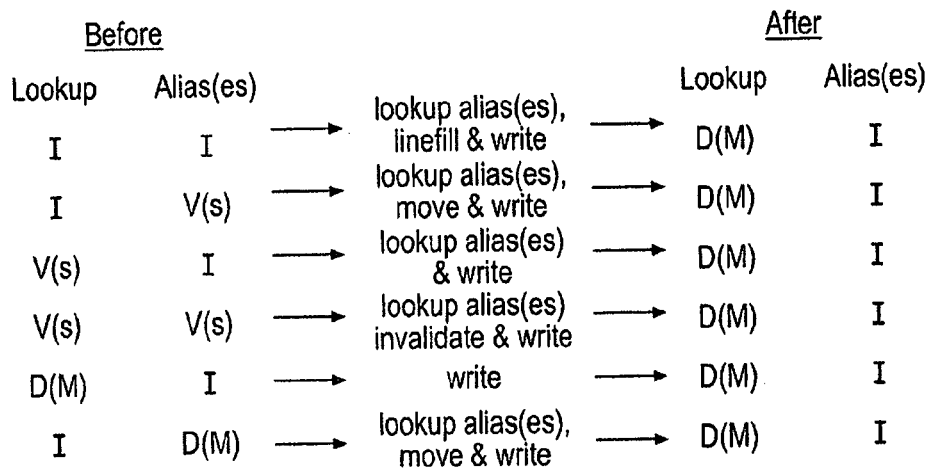
FIG. 4 schematically illustrates the action of the aliasing management logic for write operations in different scenarios.

FIG. 4 illustrates the behaviour of the aliasing management logic 10 in controlling the cache memory for write operations using an MSI-type protocols. In the first scenario, the initial cache row in which a lookup is made does not contain the data and accordingly a lookup in the aliased positions is triggered. These do not contain the data. Accordingly, a linefill operation is performed to the initial cache row and then the desired write is performed. A linefill is performed since a cache row will typically store multiple words of data which are managed together whereas a write may only take place to a single word within that cache row. In the second scenario, the initially looked up cache row does not contain the data, but the aliased cache rows when checked do contain the data. In this circumstance, the data in those other positions is moved to the initial cache row and invalidated in the aliased positions prior to a write being made to that data in the initially looked up cache row. In the third scenario, the initially looked up cache row does contain the data being looked for and it is not dirty. A check is also made within the aliased positions and since these do not contain a copy of the same data, they do not need to be marked as invalid. A write is then performed upon the initially looked up cache row data. In the fourth scenario, the initially looked up cache row contains the data being sought and this is clean. The aliases are also looked up and these contain the data as well. These aliased positions are marked as invalid and then the write is performed to the initially looked up cache row. In this example embodiment, only a single dirty copy of the data may be held within the cache way. In the firth scenario, the initially looked up cache row contains the data and this is marked as dirty. Since only a single dirty copy may be held, there is no need to lookup the data in the aliased positions and the write can be performed to the initially looked up cache row. In the final scenario, the initially looked up cache row does not contain the data and the lookup in the aliased rows indicates that the data is present in those aliased rows. This data is then moved to the initially looked up cache row and the write is then performed. The aliased cache row is marked as invalid.

It will be appreciated that the behaviour illustrated in FIG. 4 corresponds to the approach whereby multiple copies of data are invalidated when a write is made. An alternative approach which could be used would be to update all of these copies, but this may consume more overhead in terms of time, power and performance.

It may be considered that the action of the aliasing management logic 10 in performing the various operations illustrated in relation to FIGS. 3 and 4 may slow down the operation of the system as a whole. However, it should be appreciated that situations in which a cached page within a given cache way is smaller in size than the cache way are relatively rare and in most circumstances the checking and other operations performed by the aliasing management logic 10 and illustrated in FIGS. 3 and 4 are not needed. In these circumstances, the direct paths to the cached data way 12 and the cached tag way 14 illustrated in FIG. 2 are used and the cache performs normally. The aliasing management logic 10 is relatively non-intrusive to the majority of the cache behaviour and yet provides the ability to avoid data integrity problems that would otherwise need to be prevented by placing restrictions on the way in which an operating system could map virtual to physical address space.

Variations on the above example embodiments which are also possible include:

Option 1—handle reads to aliases of modified lines as triggering write-back and then copying line (rather than moving) to increase the chance of subsequent reads to original alias hitting.

Option 2—split tags into individually addressable RAMs so that tags for multiple aliases may be looked up and/or modified simultaneously—this can address some of the performance concerns by allowing the alias checking to be performed in parallel with the initial lookup although still giving the speed, power and area and other advantages of large data way RAMs.

Option 3—use other protocols such as MESI Note that existing valid and dirty bits can be re-interpreted and used to encode the four MESI states without having to introduce extra memory.

This can also address the performance concerns discussed above if by default a line is marked as exclusive when it is initially filled for reading and only changed to shared when a copy is made as this allows writes to a clean, valid, exclusive line to proceed without the need for an alias check.

It is also possible to use protocols where multiple copies of dirty lines are managed. For example, by supporting five states: modified exclusive, modified shared, clean exclusive, clean shared and invalid.

Option 4—if this technique were to be used in a multi-processor system with a coherency protocols managing coherency between the caches of different processors then the coherency management logic would be involved in this process. The choice of coherency protocol used between caches may have an effect on the choice of possible states and transitions for the aliased copies within each cache and vica versa.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   a processor for generating virtually addressed data access requests to virtual addresses, said virtual addresses being mapped to physical addresses using a plurality of page table entries, each page table entry having a page size corresponding to a number of contiguous virtual addresses mapped to contiguous physical addresses with said page table entry; and
   a cache memory having one or more cache ways, each of said cache ways comprising a plurality of cache rows and receiving said data access requests from said processor, said cache memory being virtually indexed and physically tagged; wherein
   each of said one or more cache ways stores data values for a block of virtual addresses larger in size than a minimum page size such that a plurality of different virtual addresses corresponding to different cache rows within one of said one or more cache ways can have respective page table entries mapping to a common physical address; and further comprising:
   aliasing management logic for managing coherency between data values within different cache rows of a plurality of different virtual addresses within a cache way mapping to a common physical address, each of said different cache rows concurrently storing a valid copy of data values stored at said common physical address.

2. Apparatus as claimed in claim 1, wherein when a data access request from said processor to a cache row for a first virtual address misses within said cache memory, said aliasing management logic is operable to check if a cache row corresponding to a second virtual address within said cache way which could map to a common physical address with said first virtual address is storing data values for said virtual address and if so to copy said data values from said cache row for said second virtual address to said cache row for said first virtual address.

3. Apparatus as claimed in claim 1, wherein when a data write from said processor is made to a cache row of a first virtual addresses within said cache memory, said aliasing management logic is operable to check if a cache row corresponding to a second virtual addresses within said cache way which could map to a common physical address with said first virtual address is storing data values for said virtual address and if so to copy said data values written to said cache row for said first virtual address to said cache row for said second virtual address.

4. Apparatus as claimed in claim 1, wherein when a data write from said processor is made to a cache row of a first virtual addresses within said cache memory, said aliasing management logic is operable to check if a cache row corresponding to a second virtual addresses within said cache way which could map to a common physical address with said first virtual address is storing data values for said virtual address and if so to invalidate said cache row for said second virtual address.

5. Apparatus as claimed in claim 1, wherein said processor is a multi-threaded processor operable to switch between contexts each having respective page table entries.

6. Apparatus as claimed in claim 1, wherein said aliasing management logic is responsive to and maintains coherency data for each cache row specifying if said cache rows is one of:
   (i) modified;
   (ii) sharable; or
   (iii) invalid.

7. A method of processing data, said method comprising the steps of:
   generating with a processor virtually addressed data access requests to virtual addresses, said virtual addresses being mapped to physical addresses using a plurality of page table entries, each page table entry having a page size corresponding to a number of contiguous virtual addresses mapped to contiguous physical addresses with said page table entry; and
   receiving said data access requests from said processor at a cache memory having one or more cache ways, each cache way comprising a plurality of cache rows, said cache memory being virtually indexed and physically tagged; wherein
   each of said one or more cache ways is operable to store data values for a block of virtual addresses larger in size than a minimum page size such that a plurality of different virtual addresses corresponding to different cache rows within one of said one or more cache ways can have respective page table entries mapping to a common physical address; and further comprising:
   managing coherency between data values within different cache rows of a plurality of different virtual addresses within a cache way mapping to a common physical address, each of said different cache rows concurrently storing a valid copy of data values stored at said common physical address.

* * * * *